United States Patent [19]

Wenz et al.

[11] Patent Number: 5,143,766
[45] Date of Patent: Sep. 1, 1992

[54] SELF-ADHESIVE BITUMINOUS ROOFING AND SEALING WEB WITH COVER SHEET

[75] Inventors: Ute Wenz, Wiesbaden; Ekkehard Beer, Bad Schwalbach, both of Fed. Rep. of Germany

[73] Assignee: Hoechst Aktiengesellschaft, Frankfurt am Main, Fed. Rep. of Germany

[21] Appl. No.: 650,762

[22] Filed: Feb. 5, 1991

[30] Foreign Application Priority Data

Feb. 9, 1990 [DE] Fed. Rep. of Germany ....... 4003861

[51] Int. Cl.$^5$ ...................... B32B 11/00; B32B 11/04; D06N 5/00
[52] U.S. Cl. ...................... 428/40; 428/291; 428/352; 428/354; 428/489; 428/447; 428/216; 428/219; 428/252; 428/297; 428/236
[58] Field of Search ............... 428/291, 489, 352, 354, 428/40

[56] References Cited

U.S. PATENT DOCUMENTS

| | | | |
|---|---|---|---|
| 4,091,135 | 5/1978 | Tajima et al. | 428/352 X |
| 4,559,267 | 12/1985 | Freshwater et al. | 428/352 |
| 4,622,252 | 11/1986 | Strobeck | 428/291 X |
| 4,714,651 | 12/1987 | Hartmann et al. | 428/280 |
| 4,992,315 | 2/1991 | Zickell et al. | 428/489 X |
| 5,013,591 | 5/1991 | Haushofer et al. | 428/352 X |

FOREIGN PATENT DOCUMENTS 3405109A 10/1985 Fed. Rep. of Germany .

OTHER PUBLICATIONS

Handbook of Adhesives, Third Edition, edited by Irving Skeist, Ph.D., pp. 5, 6, 9 and 174.
Plastics Technical Dictionary, Part 1: Alphabetical Dictionary English–German, by A. M. Wittifoht, p. 443.

Primary Examiner—George F. Lesmes
Assistant Examiner—D. R. Zirker
Attorney, Agent, or Firm—Foley & Lardner

[57] ABSTRACT

A self-adhesive bituminous sealing web having a support layer in the form of a scrim, a woven fabric or a non-woven material, both surfaces of which are covered with a bituminous coating, an adhesive layer disposed on one surface thereof and a cover sheet. The cover sheet includes at least one thermoplastic polymer layer and at least one layer of a woven fabric or non-woven material made of highly tear-resistant plastic fibers or threads.

23 Claims, 1 Drawing Sheet

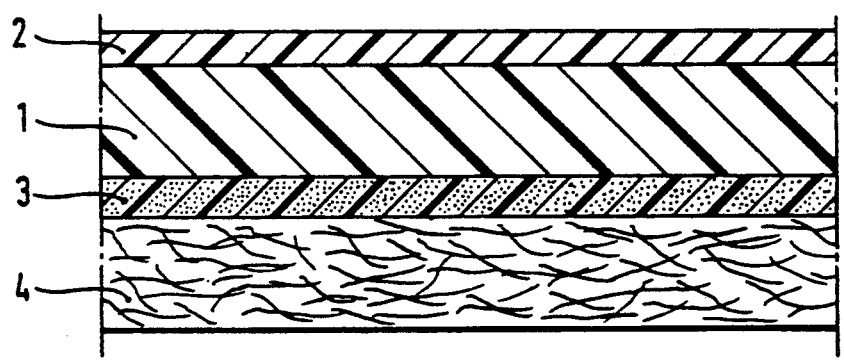

SELF-ADHESIVE BITUMINOUS ROOFING AND SEALING WEB WITH COVER SHEET

BACKGROUND OF THE INVENTION

The present invention relates to a sealing web comprising a support layer in the form of a scrim, a woven fabric or a non-woven material, both surfaces of which are covered with a bituminous coating, an adhesive layer disposed on one surface thereof and a cover sheet.

Conventional roof sealing webs which are employed, in particular, for covering flat-roof structures, comprise a support layer which is covered on both sides with a bituminous coating. These bituminous composite webs are also often used as sealing webs for subterranean structures such as, for example, tunnels, and typically include an additional foil or sheet layer made of metal or plastic.

The support layers and/or reinforcing inserts employed for the bituminous roof sealing web comprise sheet-shaped articles in the form of woven fabrics or scrims, such as glass fiber mats or the like, but in particular also random non-woven materials made of polymer fibers or threads, for example of a polyester material, which are bonded in an appropriate manner. Random non-woven materials preferably are used because, compared with woven fabrics, they have good elastic properties, independent of any particular stretching direction.

Roof sealing webs of this kind are fabricated in a simple way by passing the support material, preferably a spun-bonded fabric, through a bitumen bath at elevated temperatures. In the process the support material is both impregnated and coated and, as a result, a multilayer article is obtained, which has an inner layer formed of the support material and outer layers comprising bitumen or modified bitumen. Such roof sealing webs are known in the art and are described, for example, in DE-C-31 45 266 and DE-A-34 05 109.

In order to be able to form the bituminous roof sealing webs into rolls and, above all, to permit unwinding of the rolls formed of the bituminous webs, particulate inorganic materials, such as talcum, sand or slate are usually spread on the inherently sticky bituminous surfaces. When the roof sealing web is fixed in place according to the welding process these release media have, however, the disadvantage that they considerably impair firm bonding of the roof sealing web to the roof. Bubble formations are then frequently observed, which eventually produce leakages.

For laying out and attaching the bituminous sealing webs to the surfaces to be sealed (roofs, cellar walls, bridge constructions, etc.) two process variants are basically known. On the one hand, it is possible to use the flame method, in which one surface of the sealing web is molten with the aid of open flames in the process of laying out the web and the sealing web is then bonded to the base by means of this molten surface; on the other hand, the casting method can be used, in which the sealing web is bonded adhesively to the base with the aid of bitumen or tar which has been heated beyond its melting point. The two methods have been described in bulletins by Messrs. Boerner (Bad Hersfeld, Nuernberg and Dietzenbach, Federal Republic of Germany). In more recent times, a cold-bonding method occasionally is employed.

The present invention is based on sealing webs which are fixed in place according to the cold-bonding method. The adhesive layers conventionally used comprise pressure-sensitive adhesive layers on a basis of caoutchouc or artificial butadiene polymers. Such permanently adhesive layers have, however, the disadvantage that a web which has been coated with an adhesive layer of this kind on one side thereof and then wound up into a roll can no longer be drawn off from the roll, because the front and the back of the web permanently stick together.

In order to obviate the above-described disadvantage, the free surface of the adhesive layer must be provided with a cover sheet which can be removed easily prior to laying out the web on the base. Within the scope of the present invention, the term "cover sheet" thus refers to a release layer which is applied to the free surface of the adhesive layer of the bituminous sealing web and prevents the sticking together of the individual layers of a roll formed of the sealing web. When the sealing web is drawn off from the roll the cover sheet remains as an integral part on the side of the sealing web to which it was originally applied, but is removed prior to actual application, i.e., laying out the sealing web on the base to be sealed.

Conventionally employed cover sheets comprise a silicone-treated kraft paper or a silicone-treated polyolefin film. These cover sheets, however, have the drawback that they easily tear when they are peeled off from the adhesive layer and that their resistance to tear propagation is very unsatisfactory. This often leads to highly inefficient delays in the process of laying out the sealing webs.

SUMMARY OF THE INVENTION

It is therefore an object of the present invention to provide a self-adhesive bituminous sealing web comprising a cover sheet, which sealing web can be drawn off from a roll without difficulty and in which the cover sheet is also readily peeled off from the adhesive layer during the process of applying the sealing web, without giving rise to tears or tear propagation.

In accomplishing the foregoing objects there is provided according to the present invention a self-adhesive bituminous sealing web, comprising a support layer having two surfaces each covered with a bituminous coating, a first adhesive layer disposed on the free surface of one bituminous coating, and a cover sheet disposed on said first adhesive layer, Wherein said cover sheet comprises at least one first layer comprised of a thermoplastic polymer and at least one second layer selected from the group consisting of a woven fabric and a non-woven material comprised of highly tear-resistant plastic fibers or threads.

Further objects, features and advantages of the present invention will become apparent from the detailed description of preferred embodiments that follows.

BRIEF DESCRIPTION OF THE DRAWINGS

Below, an example of the invention is explained in detail by reference to the accompanying drawing wherein FIG. 1 depicts a sectional view of a preferred cover sheet according to the present invention.

DETAILED DESCRIPTION OF THE PREFERRED EMBODIMENTS

Thermoplastic polymers which can be used for preparing the first layer of the cover sheet according to the present invention comprise various polymers. It is, for example, possible to use conventional polypropylene having a melting point in the range from about 150° to 170° C. and also copolymers or mixtures of propylene with other α-olefins, for example, ethylene. The copolymers or mixtures preferably include a majority amount of propylene units. Other polymers can, however, also be provided for use, for example polyesters, in particular polyethylene terephthalate, polybutylene terephthalate or copolyesters containing terephthalic acid and isophthalic acid units or mixtures of these. The thermoplastic polymer for use in the cover sheet can furthermore include a relatively high proportion of reclaim, in particular up to about 70% by weight. "Reclaim", within the scope of the present invention, denotes film waste material which is produced in the film production and is returned to the production process in a partially recompressed form.

Conventional slip agents, anti-adhesive agents, antistatics, anti-oxidants and similar additives, each in customarily employed amounts, are also advantageously added to the thermoplastic polymer. In the present invention it has proved to be particularly favorable to add a polydialkylsiloxane, in particular a polydimethylsiloxane, in an amount of about 0.5 to 5% by weight, preferably about 1 to 3% by weight, to the thermoplastic polymer.

For the production of the cover sheet, the thermoplastic polymer is rendered molten in an extruder and the melt is extruded through a die and chilled. To further improve solidification, the chilled melt is then preferably stretch-oriented in two mutually perpendicular directions, in particular by stretching in the longitudinal and transverse directions. Transverse stretching can be followed by a heat-setting step to improve the dimensional stability. The resulting film has a thickness in the range from about 4 to 50 μm, preferably in the range from about 6 to 20 μm.

To produce the second layer of the cover sheet according to the present invention the biaxially stretch-oriented film is additionally laminated with a woven fabric or a non-woven material made of a highly tear-resistant plastic. Plastics of this kind include, in particular, thermoplastic polyesters, such as polyethylene terephthalate or the other polyesters already mentioned above. The woven fabric or the non-woven material preferably has a weight per unit area of about 10 to 100 g/m², particularly preferably of about 30 to 50 g/m². For laminating, an adhesive is applied between the fabricated film of the thermoplastic polymer and the layer of the woven fabric or the non-woven material and the two layers are then pressed together with the adhesive.

Preferable adhesives comprise conventional water- or solvent-containing adhesives, but for practical application thermoplastic adhesives or two-component adhesives, for example on a basis of polyurethane, are particularly preferred.

The bituminous sealing web of the present invention can be produced by simply placing the cover sheet with the free surface of the thermoplastic polymer film which preferably includes the polydialkylsiloxane, upon the adhesive layer of the pre-fabricated laid flat sealing web and then winding up the resulting laminate structure. The webs can also be united by means of rolls.

In a particular embodiment of the invention the free surface of the sealing web, opposite the cover sheet, is coated with a layer containing a particulate inorganic material, in particular slate.

In another preferred embodiment of the invention the cover sheet comprises a two-layer film of a thermoplastic polymer, an adhesive layer and a woven fabric or a non-woven material. The two-layer film of the thermoplastic polymer is formed of a base layer and a top layer which is thinner than the base layer and includes a polydialkylsiloxane in the amount by weight indicated above, relative to the weight of the top layer. Two-layer films of this kind are usually prepared according to the coextrusion process. This embodiment offers the advantage of an improved adhesion of the adhesive layer via which the woven fabric or the non-woven material is anchored to the film of the thermoplastic polymer.

As shown in FIG. 1, the two-layer biaxially stretch-oriented film of polypropylene comprises a base layer 1 and a top layer 2 which includes a polydimethylsiloxane. The base layer 1 and the top layer 2 are prepared according to the coextrusion process and therefore adhere firmly to one another. A random non-woven material 4 made of polyester fibers is bonded to the base layer 1 by means of an adhesive layer 3.

What is claimed is:

1. A self-adhesive bituminous sealing web, comprising a support layer having two surfaces each covered with a bituminous coating, a first adhesive layer bonded on the surface not covering the support layer of one of the bituminous coatings, and a cover sheet disposed on said first adhesive layer, wherein said cover sheet comprises at least one first layer comprised of a thermoplastic polymer and at least one second layer selected from the group consisting of a woven fabric and a non-woven material comprised of highly tear-resistant plastic fibers or threads, and wherein said first layer is disposed on said first adhesive layer.

2. A sealing web according to claim 1, wherein said support layer comprises a scrim, a woven fabric or a non-woven material.

3. A sealing web according to claim 1, wherein said first layer of said cover sheet comprises a thermoplastic polymer selected from the group consisting of polypropylene and polyester.

4. A sealing web according to claim 1, wherein said first layer of said cover sheet comprises a copolymer of propylene and a second α-olefin.

5. A sealing web according to claim 3, wherein said first layer comprises a polyester selected from the group consisting of polyethylene terephthalate, polybutylene terephthalate, a copolyester which includes terephthalic acid and isophthalic acid units, and mixture thereof.

6. A sealing web according to claim 1, wherein said first layer further comprises a polydialkylsiloxane in an amount of about 0.5 to 5% by weight, relative to the weight of said thermoplastic polymer.

7. A sealing web according to claim 6, wherein said polydialkylsiloxane is present in an amount of about 1 to 3% by weight, relative to the weight of said thermoplastic polymer.

8. A sealing web according to claim 6, wherein said polydialkylsiloxane comprises a polydimethylsiloxane.

9. A sealing web according to claim 7, wherein said polydialkylsiloxane comprises a polydimethylsiloxane.

10. A sealing web according to claim 1, wherein said first layer of said cover sheet comprises a biaxially stretch-oriented and heat-set thermoplastic polymer film having a thickness of about 4 to 50 μm.

11. A sealing web according to claim 10, wherein said thermoplastic polymer film has a thickness of about 6 to 20 μm.

12. A sealing web according to claim 1, further comprising a second adhesive layer disposed between said first and second layers of said cover sheet.

13. A sealing web according to claim 12, wherein said second adhesive layer is a thermoplastic adhesive.

14. A sealing web according to claim 1, wherein said second layer of said cover sheet has a weight per unit area from about 20 to 100 g/m².

15. A sealing web according to claim 14, wherein said second layer of said cover sheet has a weight per unit area from about 30 to 50 g/m².

16. A sealing web according to claim 1, wherein said second layer comprises a non-woven material comprised of polyester fibers.

17. A sealing web according to claim 1, wherein said cover sheet comprises a two-layer thermoplastic polymer film as said first layer, an adhesive layer between said first and second layers, and a woven fabric or non-woven material layer as said second layer, said two-layer thermoplastic polymer film comprising a base layer and a top layer which is thinner than said base layer.

18. A sealing web according to claim 17, wherein said top layer further comprises a polydialkylsiloxane in an amount of about 1 to 3% by weight, relative to the weight of said top layer.

19. A sealing web according to claim 12, wherein said second adhesive layer comprises a two-component adhesive.

20. A sealing web according to claim 12, wherein said second adhesive layer comprises a water or solvent containing adhesive.

21. A sealing web according to claim 1, wherein said thermoplastic polymer comprises up to about 70% of reclaimed polymer.

22. A sealing web according to claim 1, comprising a layer of slate adjacent to said second layer.

23. A sealing web according to claim 1, wherein said cover sheet consists essentially of said first layer and said second layer.

* * * * *